(12) United States Patent
Jun

(10) Patent No.: US 7,095,805 B2
(45) Date of Patent: Aug. 22, 2006

(54) DIGITAL TV RECEIVER

(75) Inventor: Jung Sig Jun, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 10/721,786

(22) Filed: Nov. 26, 2003

(65) Prior Publication Data
US 2004/0145681 A1 Jul. 29, 2004

(30) Foreign Application Priority Data
Nov. 27, 2002 (JP) ............ 10-2002-0074220

(51) Int. Cl.
*H04L 27/14* (2006.01)
(52) U.S. Cl. .................................. 375/326
(58) Field of Classification Search ............ 375/326, 375/316, 321, 350, 261, 340, 270, 327, 355; 348/325, 725, 726; 329/304, 306, 307, 308, 329/357
See application file for complete search history.

(56) References Cited

U.S. PATENT DOCUMENTS 5,673,293 A * 9/1997 Scarpa et al. ............ 375/321
5,872,815 A * 2/1999 Strolle et al. ............ 375/312
6,160,443 A * 12/2000 Maalej et al. ............ 329/304
6,862,325 B1 * 3/2005 Gay-Bellile et al. ...... 375/340

FOREIGN PATENT DOCUMENTS

KR 1020010076780 A 8/2001

* cited by examiner

Primary Examiner—Robert Pascal
Assistant Examiner—Krista M. Flanagan
(74) Attorney, Agent, or Firm—McKenna, Long & Aldridge, LLP

(57) ABSTRACT

A device of digital TV receiver including an A/D converter for converting an analog signal into a digital passband signal, a carrier recovery for converting the digital passband signal into a digital baseband signal, and a symbol clock recovery for calculating the digital passband real/imaginary signals of the A/D converter or the digital baseband real/imaginary signals of the carrier recovery, detecting timing error information, and generating and outputting two times the frequency of the symbol clock recovered from the detected timing error information is disclosed.

8 Claims, 7 Drawing Sheets

SYMBOL CLOCK RECOVERY

DIGITAL TV RECEIVER

This application claims the benefit of Korean Application No. P2002-74220, filed on Nov. 27, 2001, which is hereby incorporated by reference as if fully set forth herein.

BACKGROUND OF THE INVENTION

1. Field of the Invention

The present invention relate to a digital TV receiver, and more particularly, to an apparatus for recovering a symbol clock from received data.

2. Discussion of the Related Art

An advanced television systems committee (ATSC) 8 VSB (Vestigial Side Band) transmission system proposed by most current digital transmission systems and a US directed digital TV transmission mode loads data only in a transmission signal to increase an effect of a frequency. That is, clock information needed for data recovery at a receiving party is not transmitted. Therefore, the same clock as that employed during the transmission should be generated among the received signals having only data to recover the data at the receiving party. A symbol clock recovery performs the role.

FIG. 1 is a block diagram illustrating a general digital TV receiver having such symbol clock recovery. Referring to FIG. 1, if a radio frequency (RF) signal modulated in a VSB mode is received through an antenna 101, a tuner 102 selects a desired channel frequency. Then, the tuner 102 converts a VSB signal of an RF band inserted in the channel frequency to a first intermediate frequency (IF) band, and outputs to an analog processor 103. The analog processor 103 performs passband filtering and gain controlling to the first IF signal outputted from the tuner 102 for converting the first IF signal into a second IF signal, and outputs to an A/D converter 104. The A/D converter 104 samples the second IF signal with a fixed frequency (i.e., the fixed frequency is different from the symbol clock frequency, and normally 25 MHz), and outputs to a phase splitter 105. That is, the data sampled at 21.52 MHz two times the frequency of the symbol clock is received at the receiving party although the outputted data from the A/D converter 104 is digital data sampled at 25 MHz.

The phase splitter 105 splits the digital signal into a passband real signal r(t)) and a passband imaginary signal (i(t)), and outputs the signal to the carrier recovery 106. At this time, for easier description, the real/imaginary signals outputted from the phase splitter 105 is named as I and Q signals, respectively.

The carrier recovery 106 converts the digital signals I and Q of the passband outputted from the phase splitter 105 to a baseband. The output signal of the carrier recovery 106 is inputted to a symbol clock recovery 107, a synchronized signal detector 108 and a digital processor 109.

At this time, the symbol clock recovery 107 recovers all the symbol clocks employed by from the carrier recovery 106 to the digital processor 109 and the synchronized signal detector 108 detects a segment sync and a field sync from the digital baseband signal.

FIG. 2 is a block diagram of the carrier recovery 106 employing a FPLL (Frequency Phase Locked Loop). That is, the carrier recovery 106 having the FPLL demodulates the passband I and Q signals outputted from the A/D converter 104 into the baseband I and Q signals for frequency and phase locking.

Referring to FIG. 2, the passband I and Q signals being digitized through the A/D converter 104 and the phase splitter 105 are inputted to a complex multiplier 201 of the carrier recovery. At this time, the real signal (r(t)) and the imaginary signal (q(t)) outputted from the phase splitter 105 is expressed as a following formula.

$$r(t)=\{I(t)+p\} \cos(w_c t+\Psi)-Q(t)\sin(w_c t+\Psi)$$
$$i(t)=\{I(t)+p\} \sin(w_c t+\Psi)+Q(t)\cos(w_c t+\Psi) \quad \text{[Formula 1]}$$

I(t) is a signal before a modulation and p is a pilot signal inputted to the transmitter for the carrier recovery. Also, $w_c$ is a frequency of the carrier signal existing in an input signal and $\Psi$ is a phase of the carrier signal existing in the input signal. Q(t) is an orthogonal signal component of I(t).

Meanwhile, the complex multiplier 201 of the carrier recovery 106 multiplies the passband I and Q signals as the formula 1 by a standard carrier signals NCOI and NCOQ outputted from the NCO 205, and converts the passband I and Q signal into the baseband I and Q signals (I'(t),Q'(t)) as a following formula 2.

$$I'(t)=\{I(t)+p\} \cos(\Delta w_c t+\Psi)-Q(t)\sin(\Delta w_c t+\Psi)$$
$$Q'(t)=\{I(t)+p\} \sin(\Delta w_c t+\Psi)+Q(t)\cos(\Delta w_c t+\Psi) \quad \text{[Formula 2]}$$

The $\Delta w_c$ is a beat frequency of the carrier signal $w_c$ employed by the transmitter and the standard carrier signals NCOI and NCOQ generated from the receiver.

The I and Q signals of the baseband are outputted to a low pass filter 202 as well as to the symbol clock recovery 107 and the digital processor 109.

The low-pass filter 202 filters the low pass I and Q signals to extract the carrier and outputs to an error detector 203. That is, the carrier recovery 106 recovering the carrier needs only signals around the frequency having the pilot frequency in a band width of 6 MHz and, therefore, the low-pass filter prevents the efficiency of the carrier recovery from being reduced by removing the remaining frequency component having data component from the I and Q signals.

The error detector 203 detects remaining error of the carrier from the carrier signal, and outputs to the low-pass filter 204. That is, the remaining carrier error detected from the error detector 203 is outputted to an NCO 205 through the low-pass filter 204 to prevent errors from being accidentally detected. The NCO 205 generates new carrier signals NCOI and NCOQ and outputs to the complex multiplier 201.

If the carrier recovery is completely performed at the carrier recovery 106, $\Delta w_c t$ and $\Psi$ become '0', and the formula 2 will be changed to a following formula 3.

$$I'(t)=I(t)+p$$
$$Q'(t)=Q(t) \quad \text{[Formula 3]}$$

The symbol clock recovery 107 performs the symbol clock recovery from the signal of the formula 3 and generates the symbol clocks employed in all digital areas of the receiver.

However, if the carrier recovery is not completely carried out in the carrier recovery 106, the symbol clock recovery 107 recovers the symbol clock from the signal of the formula 2. Thus, the symbol clock recovery is not normally performed being influenced by the frequency and the phase between the carrier signals employed by the receiver and the standard carrier signal generated from the receiver such as $\Delta w_c$ and $\Psi$.

In other words, as described in FIG. 1, the performance of the carrier recovery largely influences the performance of the symbol clock recovery in a structure the carrier recovery and the symbol clock recovery is connected. The symbol clock recovery is influenced by the remaining frequency and phase error not completely removed from the carrier recovery, and that gives bad influence on the total performance of the symbol clock recovery.

The reason why the symbol clock recovery is located at an end of the general carrier recovery is that the symbol clock recovery is designed under an assumption that the role of the carrier recovery is completed. Therefore, if the carrier recovery is not completely performed, the symbol clock recovery is not performed as well.

SUMMARY OF THE INVENTION

Accordingly, the present invention is directed to a digital TV receiver for recovering a symbol clock irrespective of the remaining phase and phase error of the carrier recovery that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the digital TV receiver includes an A/D converter for converting an analog passband signal into a digital passband signal, a carrier recovery for converting the digital passband signal into a digital baseband signal, a symbol clock recovery for generating and outputting the two times frequency of the symbol clock corrected from the detected timing error information.

In another aspect of the present invention, the digital TV receiver includes the A/D converter for sampling the analog passband signal with a fixed frequency generated from the fixed oscillator and converting the digital passband signal, the carrier recovery for multiplying the digital passband signal by a standard carrier signal generated from the carrier recovery to convert the digital passband signal into the digital baseband signal, a first resampler for resampling the digital baseband real/imaginary signals generated from the carrier recovery to two times frequency and interpolating each of them, the symbol clock recovery for detecting timing error information from the digital passband signal or the digital baseband signal and generating and outputting the two times frequency recovered from the detected timing error information.

In this case, the symbol clock recovery includes an operator for calculating each of the digital baseband real/imaginary signals interpolated and outputted from the first resampler, and outputting the calculation; a pre-filter for passing only a frequency of a particular band to recover the symbol clock from the output of the operator; a timing error detector for detecting timing error information from the output of the pre-filter; a filtering unit for filtering only a low passband signal from the timing error information outputted from the timing error detector; and a NCO for generating two times the frequency of the symbol clock recovered according to low pass signal component of the filtered timing error information and outputting to the first resampler.

The operator squares each of the digital baseband real/imaginary signals interpolated and outputted from the first resampler, adds the two squared signals, and outputs the calculation; or calculate an absolute value for each of the digital baseband real/imaginary signals interpolated and outputted from the first resampler, adds the absolute value of the two signals, and outputs the calculation.

The symbol clock recovery includes a second resampler for resampling the digital passband real/imaginary signals outputted from the A/D converter into the two times the frequency of the symbol clock and interpolating each of the signals; a operator for calculating the digital passband real/imaginary signals outputted from the second resampler and outputting the calculation; a pre-filter for passing only a frequency of a particular band to recover the symbol clock from the output of the operator; a timing error detector for detecting timing error information from the output of the pre-filter; a NCO for generating two times the frequency of the symbol clock recovered according to low pass signal component of the filtered timing error information and outputting to the first resampler and the second resampler.

In this case, the operator squares each of the digital baseband real/imaginary signals interpolated and outputted from the second resampler, adds the two squared signals, and outputs the calculation; or calculate an absolute value for each of the digital baseband real/imaginary signals interpolated and outputted from the second resampler, adds the absolute value of the two signals, and outputs the calculation.

The symbol clock recovery includes an A/D converter for taking a sample of a fixed frequency from an analog passband signal and converting into a digital passband signal; a carrier recovery for multiplying a standard carrier signal generated from the process of the carrier recovery of the digital passband signal and converting into the digital baseband signal; and a symbol clock recovery for detecting timing error information from the digital passband signal or the digital baseband signal and generating and outputting the two times the frequency of the symbol clock corrected from the detected timing error information.

The symbol clock recovery includes a operator for calculating each of the digital baseband real/imaginary signals outputted from the carrier recovery, and outputting the calculation; a pre-filter for passing only a frequency of a particular band to recover the symbol clock from the output of the operator; a timing error detector for detecting timing error information from the output of the pre-filter; a filtering unit for filtering only the low passband signal from the timing error information outputted from the timing error detector; and a variable oscillator for generating two times the frequency of the symbol clock recovered according to low pass signal component of the filtered timing error information and outputting to the A/D converter.

In this case, the operator squares each of the digital baseband real/imaginary signals interpolated and outputted from the carrier recovery, adds the two squared signals, and outputs the calculation; or calculate an absolute value for each of the digital baseband real/imaginary signals interpolated and outputted from the carrier recovery, adds the absolute value of the two signals, and outputs the calculation.

Also, the symbol clock recovery includes a operator for calculating each of the digital baseband real/imaginary signals interpolated and outputted from the first resampler, and outputting the calculation; a pre-filter for passing only a frequency of a particular band to recover the symbol clock from the output of the operator; a timing error detector for detecting timing error information from the output of the pre-filter; a filtering unit for filtering only the low passband signal from the timing error information outputted from the timing error detector; and a variable oscillator for generating two times the frequency of the symbol clock recovered according to low pass signal component of the filtered timing error information, and outputting to the A/D converter.

In this case, the operator squares each of the digital baseband real/imaginary signals outputted from the A/D converter, adds the two squared signals, and outputs the calculation; or calculate an absolute value for each of the digital baseband real/imaginary signals outputted from the A/D converter, adds the absolute value of the two signals, and outputs the calculation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
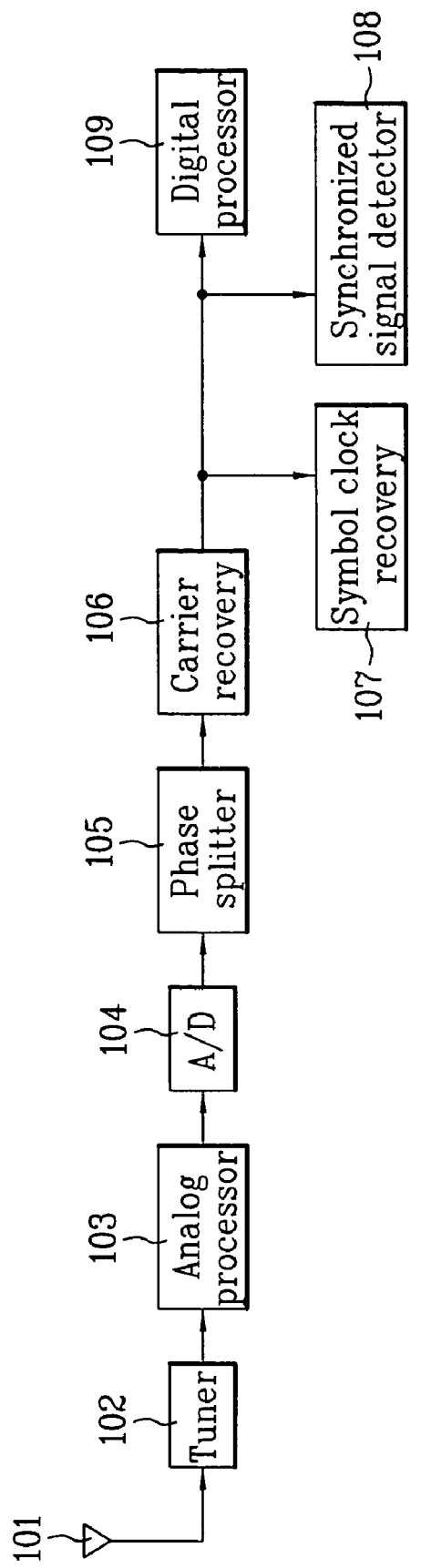
FIG. 1 illustrates a block diagram of a conventional digital TV receiver.
Figure 2:
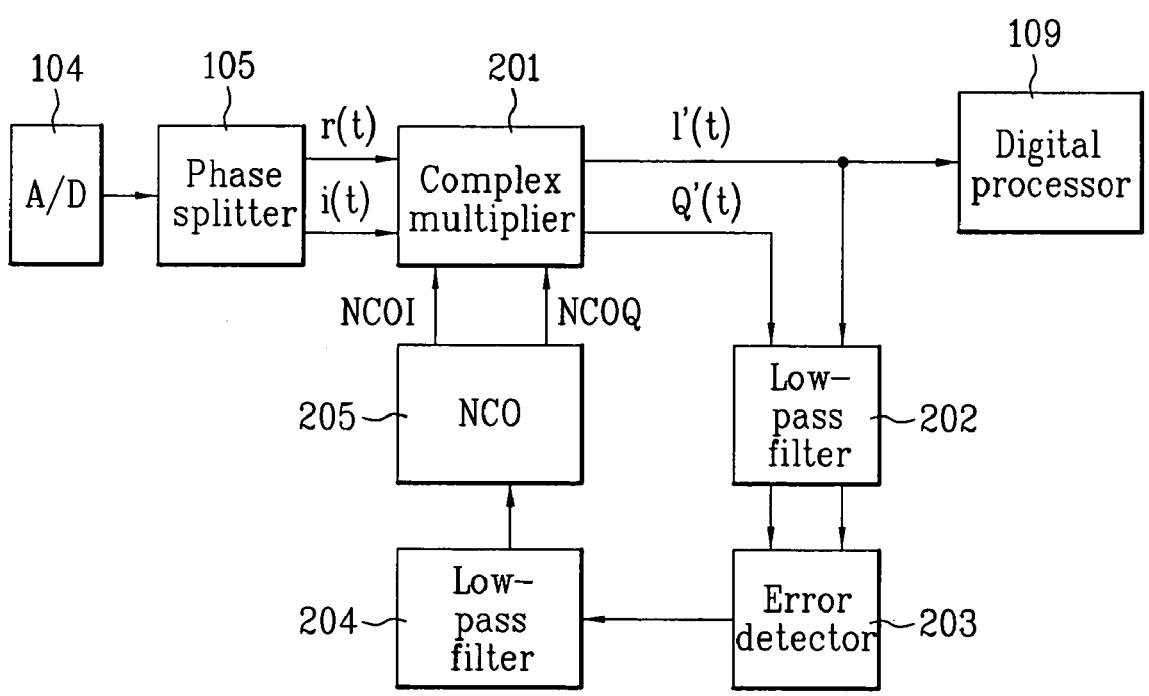
FIG. 2 is a block diagram illustrating a conventional carrier recovery of FIG. 1.
Figure 3:
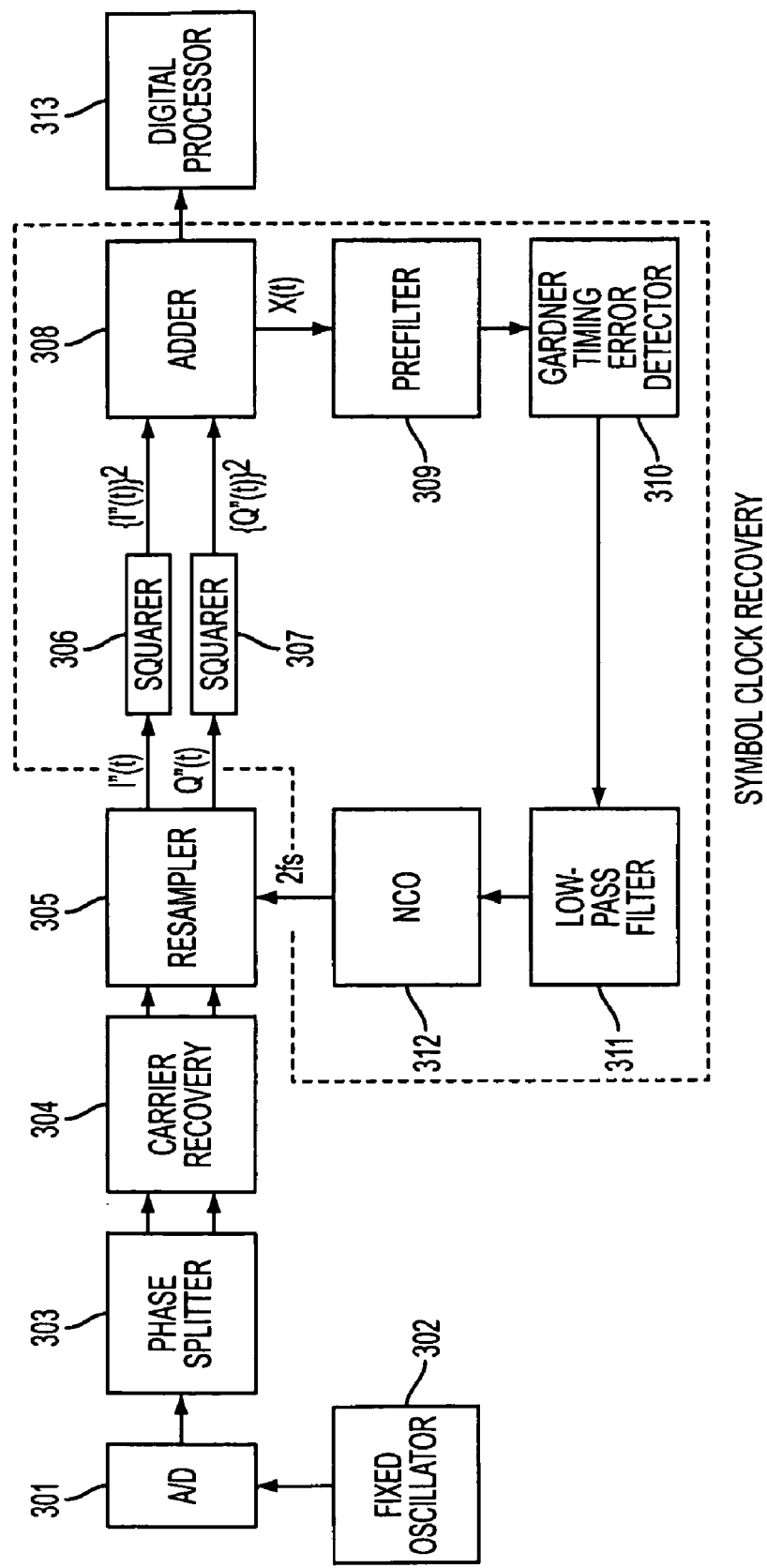
FIG. 3 is a block diagram illustrating a digital TV receiver having a symbol clock recovery according to a first embodiment of the present invention.

As illustrated in FIG. 3, an A/D converter 301 takes a sample of a fixed frequency from an analog passband signal and changes to a digital passband signal. In this case, the fixed frequency oscillated in a fixed oscillator 302 is higher than two times the frequency of the symbol clock. Since the data rate is different and there is a difficulty in controlling, a resampler 305 needs to be arranged between a carrier recovery 304 and two squarers 306 and 307 when the signal is employed in the symbol clock recovery.

The digital passband signal outputted from the A/D converter 301 is inputted to the carrier recovery 304 through a phase splitter 303 and changed into a digital baseband signal.

In this instance, the digital baseband signal is changed from the digital passband signal taken a sample of the fixed frequency different from the symbol clock frequency, and the digital baseband signal is taken as a sample of two times the frequency of the symbol clock at 21.52 MHz, and outputted for recovering the symbol clock in the resampler 305.

(I"(t)) signals of real numbers outputted from the resampler 305 are squared at the squarer 306 and (Q"(t)) signals of imaginary numbers outputted from the resampler 305 are squared at the squarer 307, inputted to an adder 308, and added, thereby the frequencies and phase errors resulted from an incomplete carrier recovery are removed. The output of the adder 308 is outputted to a timing error detector 310 through a pre-filter 309 passing only desired frequency bands for the symbol clock recovery and outputtted to a digital processor 313. The timing error detector 310 is a timing error detector of a Gardner system or of a modified Gardner system, and detects a timing error, that is, the phase error. The timing error information is inputted to an NCO 312 through a low pass filter 311. The NCO 312 generates new corrected two times the frequency of the symbol clock (2fs, fs is a symbol clock frequency) from the timing error information and outputs to the resampler 305.

Figure 4:
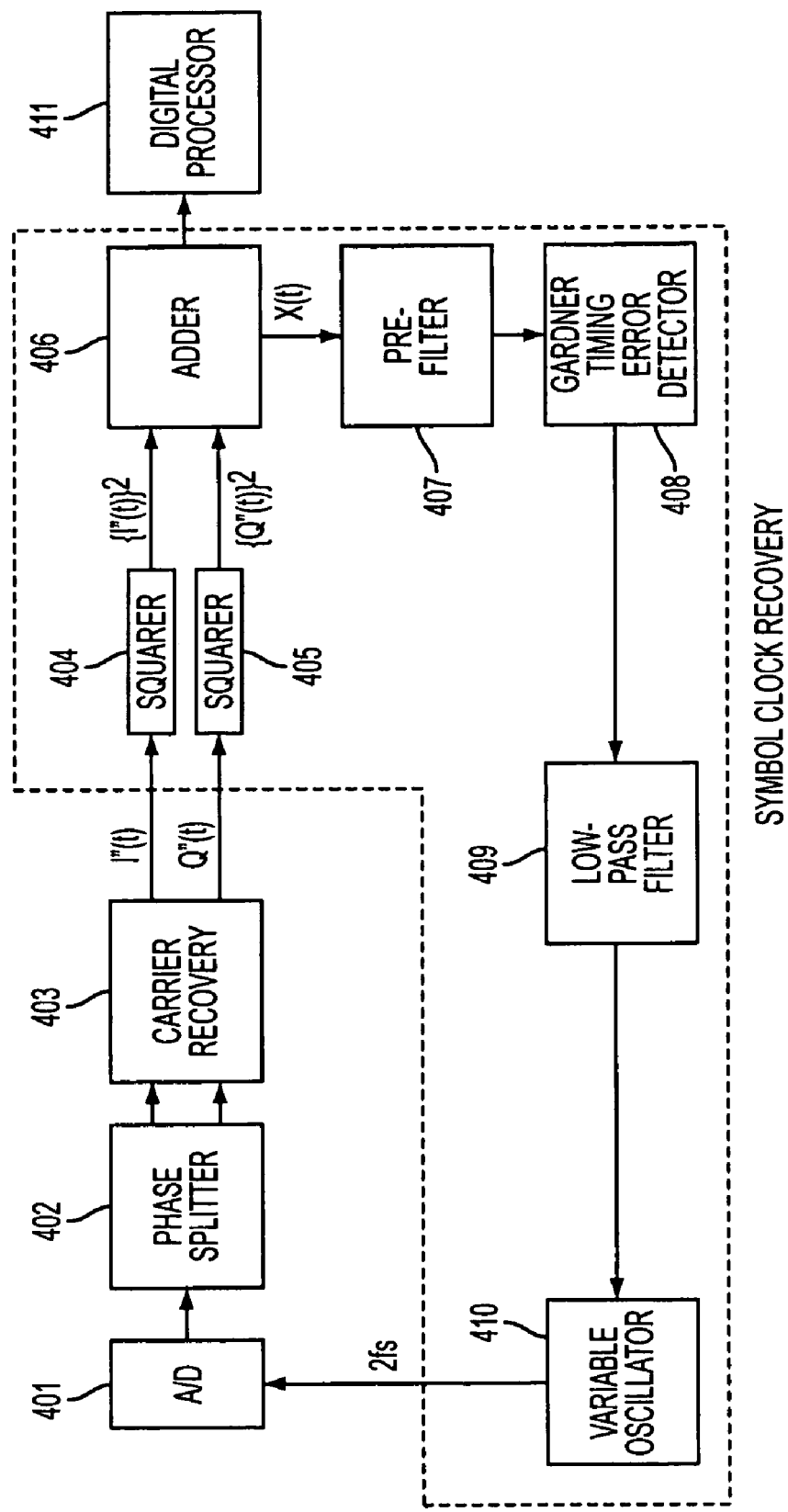
FIG. 4 is a block diagram illustrating a digital TV receiver having a symbol clock recovery according to a second embodiment of the present invention.

FIG. 4 is a preferred embodiment in case that the frequency of the clock inputted to an A/D converter 401 is not a fixed frequency but two times frequency (2fs) although an operation and role is the same as that in FIG. 3. The output of the A/D converter is inputted to a carrier recovery 403 through a phase splitter 402. In case of FIG. 4, the A/D converter 401 takes a sample of two times the frequency of the symbol clock (2fs) from the analog passband signal and changes the signal into a digital passband signal, and, thus, the resampler is not required between the carrier recovery 403 and two squarers 404 and 405. Therefore, a burden on the hardware is eased.

Also, the output of a low-pass filter 409 for filtering the timing error information of the current symbol detected from a timing error detector 408 is inputted to a variable oscillator 410 generating new two times the frequency of the symbol clock (2fs), the newly generated two times the frequency of the symbol clock (2fs) generated from the timing error information filtered at the low pass filter 409. The output of each of the two squarers 404 and 405 are inputted to an adder 406. The output of the adder 406 is inputted to a pre-filter 407 and a digital processor 411. In this case, the roles of the squarers 404 and 405, the adder 406, the pre-filter 407, the timing error detector 408 and the low-pass filter 409 are the same as the same block in FIG. 3.

In this instance, input formulas {I"(t), Q"(t)} of the two squarers in FIG. 3 and FIG. 4 are described as a formula 3 if the carrier recovery is completely carried out and as a formula 2 if the carrier recovery is not completely carried out. The output of the two squarers is the same as a following formula 4 when the carrier recovery is completed.

$$\{I''(t)\}^2 = \{I(t)+p\}^2 = I^2(t)+p^2+2pI(t)$$

$$\{Q''(t)\}^2 = Q^2(t) \qquad \text{[Formula 4]}$$

If the carrier recovery is not completely carried out, the output of the two squarers is the same as the following formula 5.

$$\{I''(t)\}^2 = [\{I(t) + p\}\cos(\Delta w_c t + \Psi)]^2 \qquad \text{[Formula 5]}$$

-continued $$= \{I(t)+p\}^2\cos^2(\Delta w_c t + \Psi)] +$$

$$Q^2(t)\sin^2(\Delta w_c t + \Psi) -$$

$$2\{I(t)+p\}Q(t)\cos(\Delta w_c t + \Psi)\sin(\Delta w_c t + \Psi)$$

$$\{Q''(t)\}^2 = [\{I(t)+p\}\sin(\Delta w_c t + \Psi) +$$

$$Q(t)\cos(\Delta w_c t + \Psi)]^2$$

$$= \{I(t)+p\}^2\sin^2(\Delta w_c t + \Psi) +$$

$$Q^2(t)\cos^2(\Delta w_c t + \Psi) +$$

$$2\{I(t)+p\}Q(t)\cos(\Delta w_c t + \Psi)\cos(\Delta w_c t + \Psi)$$

The output of the adder for adding the output of two squarers is the same as the following formula 6 in both cases when the carrier recovery is completely carried out and when not carried out.

$$X(t)=I^2(t)+Q^2(t)+p^2+2pI(t) \quad \text{[Formula 6]}$$

When the symbol clock recovery is carried out from the output of the adder, the symbol clock recovery can be carried out without interference of a carrier.

Meanwhile, when the symbol clock recovery employs the two squarers and adders for symbol clock recovery, the symbol clock recovery is able to recover the symbol clock from the passband signal not passed the carrier recovery.

Figure 5:
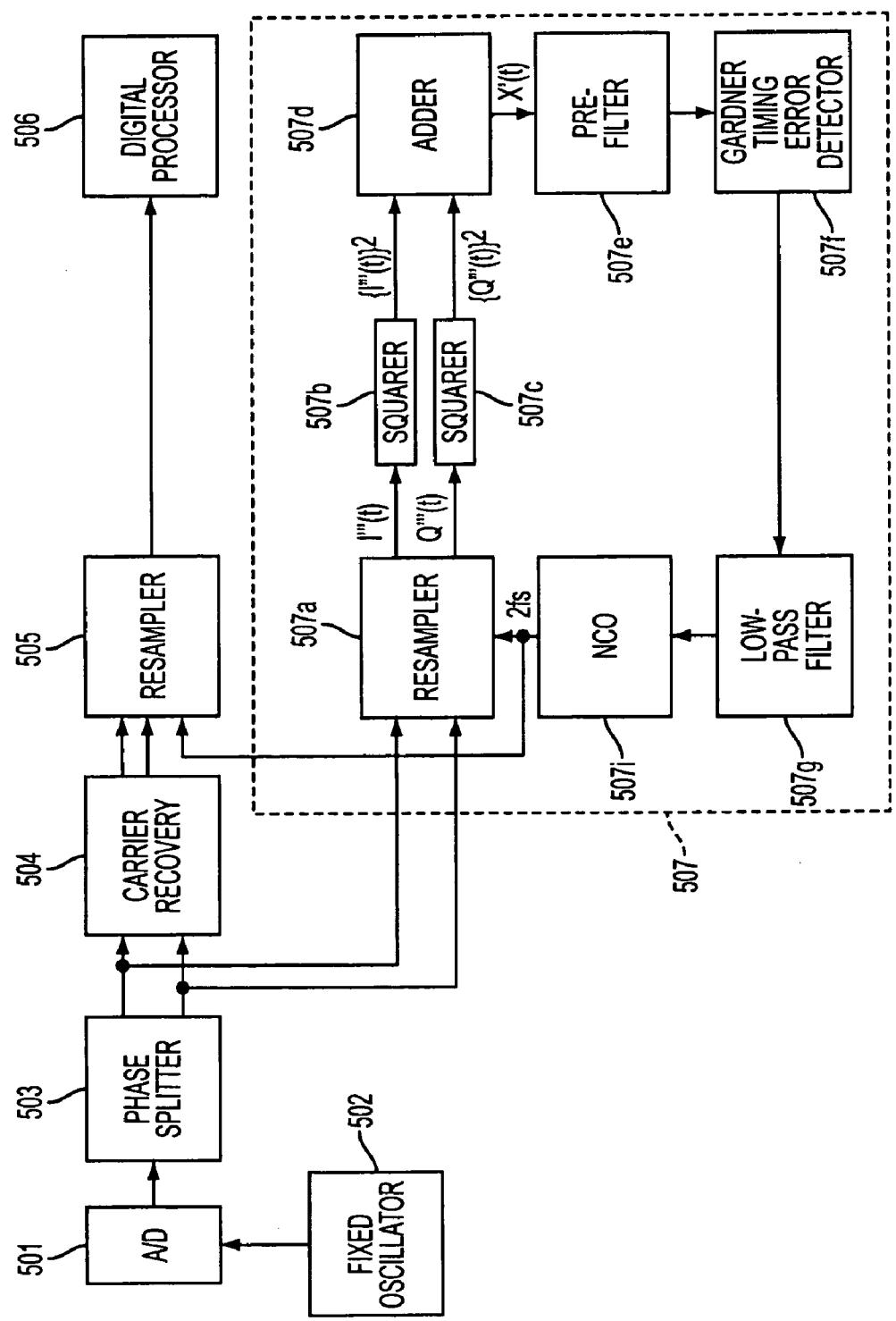
FIG. 5 is a block diagram illustrating a digital TV receiver having a symbol clock recovery according to a third embodiment of the present invention.
Figure 6:
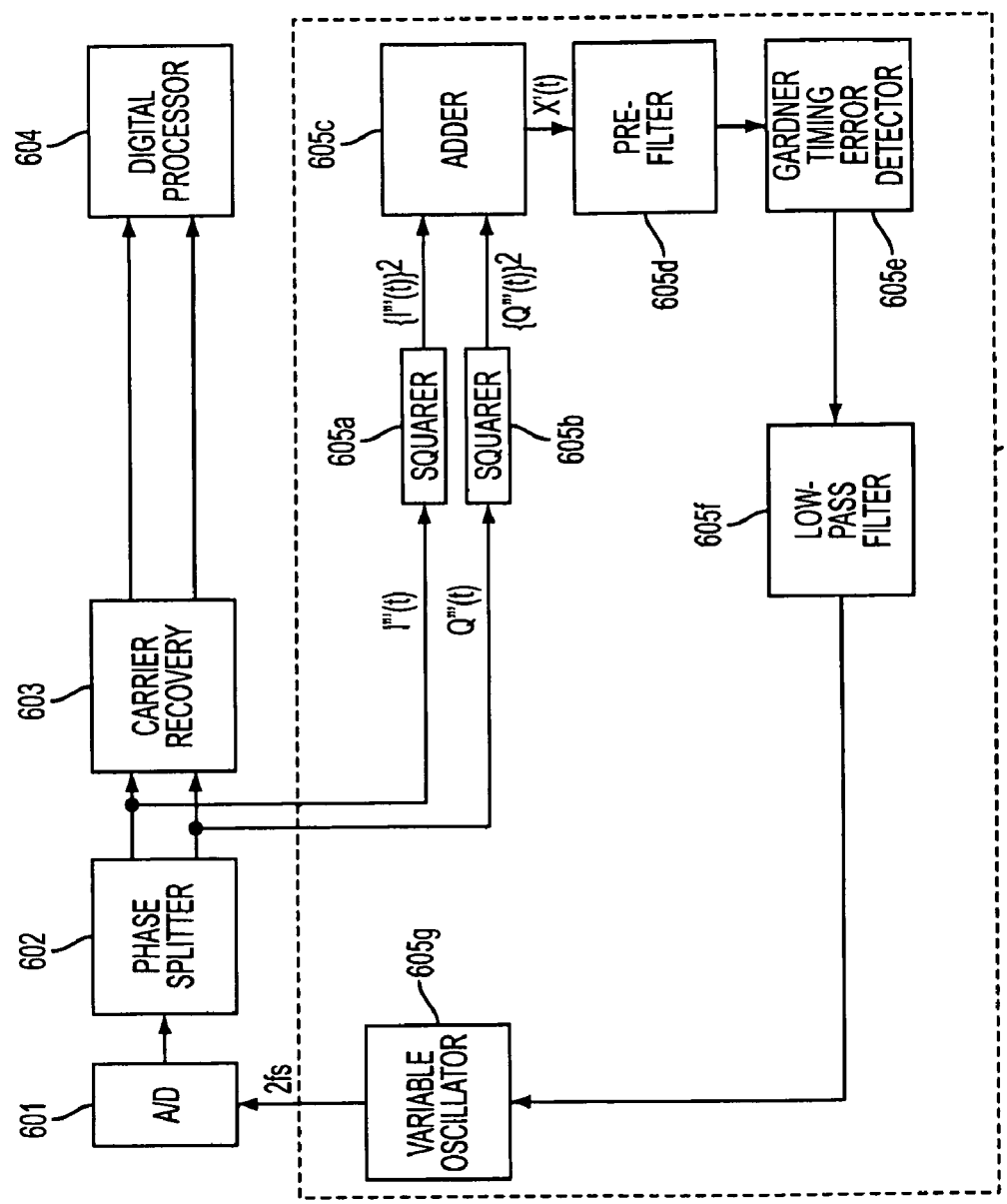
FIG. 6 is a block diagram illustrating a digital TV receiver having a symbol clock recovery according to a fourth embodiment of the present invention.

Both of FIG. 5 and FIG. 6 are embodiments of above case. FIG. 5 is an embodiment showing a fixed oscillator is employed to an A/D converter in and a resampler is added. FIG. 6 is an embodiment showing the resampler is removed using a variable oscillator.

First, an A/D converter 501 in FIG. 5 takes a sample of an analog passband signal from a fixed oscillating frequency generated from a fixed oscillator 502 and converts into the digital passband signal. The digital passband signal is outputted to a carrier recovery 504 through a phase splitter 503 as well as outputted to a symbol clock recovery 507 for the symbol clock recovery. The carrier recovery 504 multiplies a reference carrier signal completed the carrier recovery by the digital passband I, Q signals outputted through the phase splitter 503, transmits the passband I, Q signals to the baseband I, Q signals, and outputs to a resampler 505 to convert into a symbol recovered signal. The resampler 505 performs sampling of I, Q signals to two times the frequency of the symbol clock (2fs) outputted from the symbol clock recovery 507 and outputs to a digital processor 506.

Meanwhile, the symbol clock recovery 507 includes a resampler 507a for sampling the digital passband I, Q signals outputted from the phase splitter 503 for two times the frequency of the symbol clock (2fs), a squarer 507b for squaring a digital passband real number signal (I"(t)) outputted from the resampler 507a, a squarer 507c for squaring the imaginary number signal (Q"(t)), an adder 507d for adding the two squared values outputted from the two squarers 507b and 507c, a pre-filter 507e for passing only an edge part of the output spectrum of the adder 507d, a timing error detector 507f for detecting information relating to timing error from the signals passed through the pre-filter 507e, a low pass filter 507g for filtering only low pass signal component from the timing error information outputted from the timing error detector 507f and an NCO 507i for newly generating two times the frequency of the symbol clock (2fs) according to low pass component of the timing error information, and controlling sampling timing of the resamplers 507a and 505.

The resampler 507a of the symbol clock recovery 507 composed as such takes a sample of two times the frequency of the symbol clock (2fs) generated from the NCO 507i from the digital passband I, Q signals outputted from the phase splitter 503 and outputs the interpolated digital passband I, Q signals to each of the squarers 507b and 507c. Each of the two squarers 507b and 507c are nonlinear, respectively squares the passband I, Q signals, and outputs the signals to the adder 507d. When the two squared signals are added at the adder 507d, the signal is changed into the baseband I, Q signals from which the carrier is removed.

The output of the adder 507d passes through the pre-filter 507e, the Gardner timing error detector 507f, the low pass filter 507g, the NCO 507i and generates new two times the frequency of the symbol clock (2fs). The resamplers 505 and 507a outputs recovered signals using the two times the frequency of the symbol clock (2fs). In this instance, a formula 7 describing the passband I, Q signals (I'''(t), Q'''(t)) inputted to the two squarers 507b and 507c is as follows.

$$I'''(t)=\{I(t)+P\}\cos(w_c t+\Psi)-Q(t)\sin(w_c t+\Psi)$$

$$Q'''(t)=\{I(t)+p\}\sin(w_c t+\Psi)+Q(t)\cos(w_c t+\Psi) \quad \text{[Formula 7]}$$

The formula 7 shows that signals inputted to the squarers 507b and 507c are not passing through the carrier recovery 504, and the carrier remains therein.

If the passband I, Q signals (I'''(t), Q'''(t)) the carrier remains the same therein pass through each of the squarers 507b and 507c, the formula is shown as Formula 8.

$$\{I'''(t)\}^2 = [\{I(t)+p\}\cos(w_c t + \Psi) - \quad \text{[Formula 8]}$$

$$Q(t)\sin(w_c t + \Psi)]^2$$

$$= \{I(t)+p\}^2\cos^2(w_c t + \Psi) +$$

$$Q^2(t)\sin^2(w_c t + \Psi) -$$

$$2\{I(t)+p\}Q(t)\cos(w_c t + \Psi)\sin(w_c t + \Psi)$$

$$\{Q'''(t)\}^2 = [\{I(t)+p\}\sin(w_c t + \Psi) +$$

$$Q(t)\cos(w_c t + \Psi)]^2$$

$$= \{I(t)+p\}^2\sin^2(w_c t + \Psi) +$$

$$Q^2(t)\cos^2(w_c t + \Psi) +$$

$$2\{I(t)+p\}Q(t)\sin(w_c t + \Psi)\cos(w_c t + \Psi)$$

The formula 8 shows that the carrier remains the same. However, the carrier signal component is removed as in Formula 9 if the output of each of the two squarers 507b and 507c such as the formula 8 is added to the adder 507d.

$$X(t)=I^2(t)+Q^2(t)+p^2+2pI(t) \quad \text{[Formula 9]}$$

Therefore, there is an advantage of using the symbol clock recovery that the symbol clock is recovered from the passband signals without being interfered by the carrier.

In other words, there is an advantage that the symbol clock is recovered in a precise and stable way without passing through the carrier recovery, that used to be a mandatory process for the symbol clock recovery in the embodiment of FIG. 5. This describes that the symbol clock recovery 507 is able to operate and perform more stable symbol clock recovery regardless of the carrier signal component.

FIG. 6 describes an A/D converter 601 taking a sample of the analog passband signal from the two times the frequency of the symbol clock (2fs) generated from the variable oscillator instead of the fixed oscillator of FIG. 5, and converting into the digital passband signal.

a symbol clock recovery 605 performs the symbol clock recovery using the passband I, Q signals outputted from a phase splitter 602 as well. The output of the carrier recovery 603 is inputted to a digital processor 604.

In FIG. 6, the A/D converter 601 performs sampling by receiving the two times the frequency of the symbol clock (2fs), and the resampler is not required.

The symbol clock recovery 605 includes a squarer 605a for squaring the digital passband real number signal (I'''(t)) outputted from the phase splitter 602, a squarer 605b for squaring the digital passband imaginary signal (Q'''(t)), an adder 605c for adding the two squared values outputted from the two squarers 605a and 605b, a pre-filter 605d for passing only the edge portion of the output spectrum of the adder 605d, a timing error detector 605e for detecting information relating to timing error from the signals passed through the pre-filter 605d, a low pass filter 605f for filtering the low pass signal components from the timing error information outputted from the timing error detector 605e and a variable oscillator 605g for newly generating the two times the frequency of the symbol clock according to the low pass component of the timing error information, and outputting to the A/D converter 601.

In such case of FIG. 6, the A/D converter 601 samples the analog passband signal from the two times the frequency of the symbol clock and converts into the digital passband signal. Therefore, the resampler is not required and burden on the hardware is reduced.

The output of the low pass filter 605f performing low pass filtering on the current timing error information detected from the timing error detector 605e is inputted to the variable oscillator 605g generating new two times the frequency of the symbol clock and the two times frequency (2fs) generated by using the low pass filtered timing error information from the variable oscillator 605g are inputted to the A/D converter 601. In this case, the roles of the squarers 605a and 605b, the adder 605c, the pre-filter 605d, the timing error detector 605e and the low pass filter 605f are the same as the same blocks of FIG. 5.

In other words, the digital passband I, Q signals (I'''(t), Q'''(t)) inputted to the two squarers 605a and 605b is the same as the formula 7, the two squared signals ({I'''(t)}², {Q'''(t)}²) outputted from the two squarers 605a and 605b are the same as the formula 8 and the output signal (X'(t)) from the adder 605c is the same as the formula 9.

Therefore, there is an advantage of using the symbol clock recovery 605 that the symbol clock is recovered from the passband signal without being interfered by the carrier and the complexity of the hardware can be reduced resulted in removing of the resampler.

As mentioned above, there is an advantage that the symbol clock recovery is precisely and stably carried out from the signals not passed the carrier recovery 603, that is the mandatory process for the symbol clock recovery in the embodiment of FIG. 6. This describes that the symbol clock recovery 605 is able to operate and perform more stable symbol clock recovery regardless of the carrier signal component.

The symbol clock recovery in the embodiments of FIG. 3 and FIG. 6 employed two squarers and adders to the inputted signals for preventing reduced performance resulted from the incomplete performance of the carrier recovery. However, the squarer has a disadvantage that the size is getting larger when the hardware is employed and absolute value operators 706 and 707 can be employed instead of the squarers as described in FIG. 7. The symbol clock recovery not being interfered by the carrier modulator is realized to reduce the burden on the hardware and a carrier demodulator in FIG. 7.

The analog passband signal inputted to an A/D converter 701 is sampled as the output frequency of a fixed oscillator 702 and converted into the digital signal. The output of the A/D converter 701 is passed through a phase splitter 703, a carrier recovery 704 and a resampler 705, and then, inputted to the absolute value operators 706 and 707. The absolute value operators 706 and 707 apply an absolute value to each of the digital baseband I, Q signals interpolated as two times the frequency of the symbol clock at the resampler 705 and outputted, and outputs to an adder 708 to add. Influence of the carrier recovery 704 is totally removed from the output of the adder 708 as the same as the case the squarera is employed. The output of the adder 708 passes through a pre-filter 709, a timing error detector 710 and a low pass filter 711, and inputted to an NCO 712 to generate the two times the frequency of the symbol clock.

Figure 7:
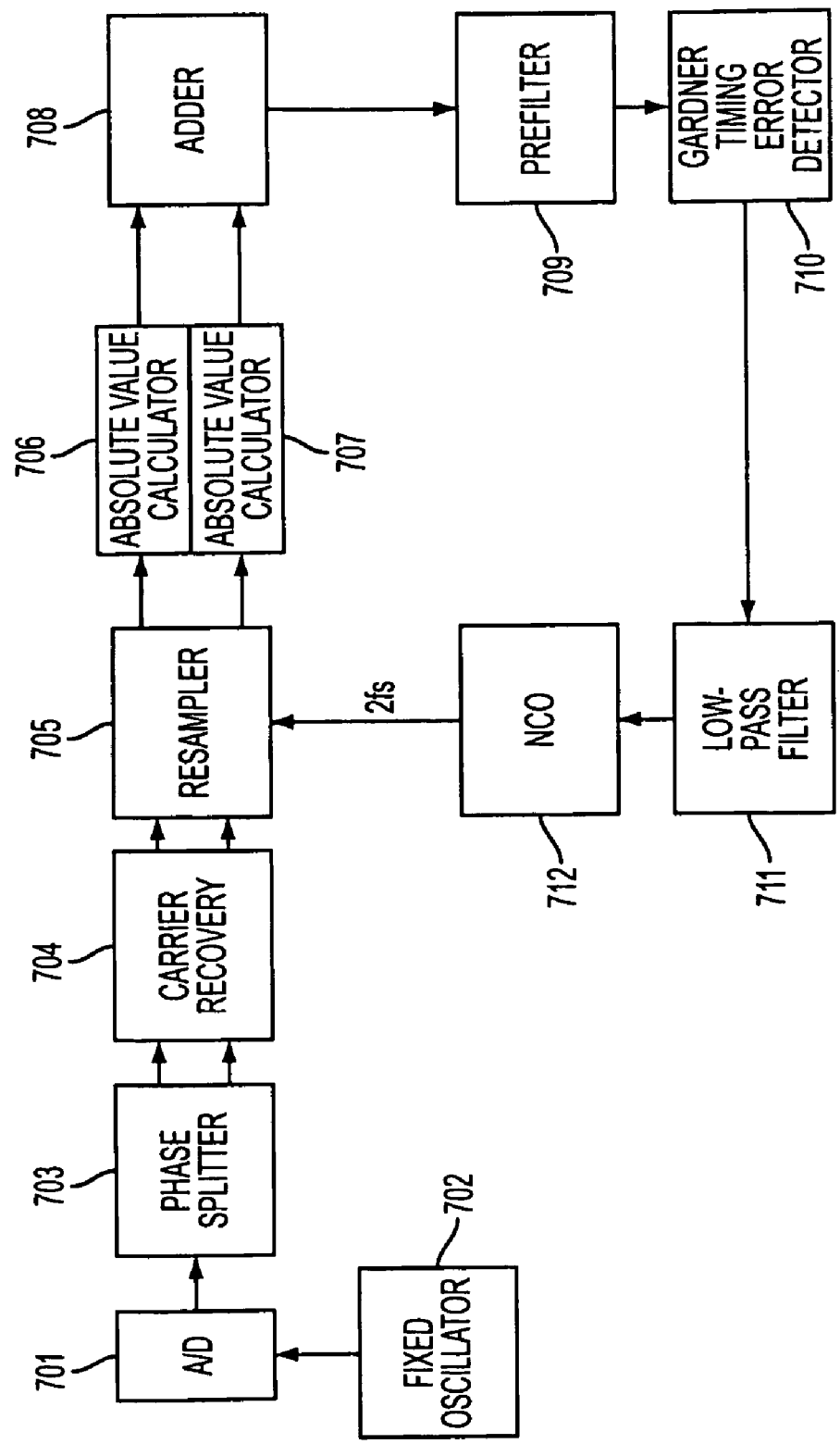
FIG. 7 is a block diagram illustrating a digital TV receiver having a symbol clock recovery according to a fifth embodiment of the present invention.

As another embodiment of FIG. 7, the A/D converter 701 may receive the two symbol clock frequencies (2fs) from the variable oscillator instead of the fixed oscillator, and convert the analog passband signal into the digital passband signal using the two absolute value operators instead of the two squarers. In this case, the resampler is not required.

As the same in FIG. 7, if the symbol clock recovery is carried out from the output of the adder 708, the symbol clock recovery can be performed without being influenced by the carrier.

Accordingly, as another embodiment of the present invention, the A/D converter converts the analog passband signal into the digital passband signal using the two times the frequency of the symbol clock. The symbol clock recovery receives, adds the digital passband real/imaginary signals outputted from the phase splitter and perform the symbol clock recovery.

In the embodiment of FIG. 3 and FIG. 6, the symbol clock recovery can be carried out nevertheless the two squarers are replaced with the two absolute value operators.

According to the digital TV receiver of the present invention, the symbol clock recovery is able to perform without being influenced by the remained carrier component after removing the remained carrier component using the two squarers and the adder. Therefore, the symbol clock recovery performs recovering symbol clock more stably even in the case the carrier recovery is not completely carried out.

Particularly, the present invention has an advantage that the symbol clock is recovered without being influenced by the carrier in case the symbol clock recovery is performed from the digital passband signal. Also, the burden on the hardware can be reduced using the two absolute value operators instead of the two sqaurers.

As aforementioned, the symbol clock recovery performs without being influenced by the incomplete carrier component although the carrier recovery performs incomplete carrier recovery because of a heavy linear noise, i.e., ghost in a transmission channel. Therefore, the performance of the symbol clock recovery is enhanced, the burden on the hardware is reduced, and particularly, the carrier recovery let information on the rear of the channel equalizer used.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A digital TV receiver including an A/D converter, a carrier recovery, a resampler, and a symbol clock recovery, wherein the symbol clock recovery comprises:
   an operator for calculating each of the digital baseband real/imaginary signals interpolated and outputted from the resampler, and outputting the calculation;
   a pre-filter for passing only a frequency of a particular band to recover the symbol clock from the output of the operator;
   a timing error detector for detecting timing error information from the output of the pre-filter;
   a filtering unit for filtering only the low passband signal from the timing error information outputted from the timing error detector; and
   an NCO for generating two times the frequency of the symbol clock recovered according to low pass signals of the filtered timing error information and outputting to the resampler.

2. The digital TV receiver of claim 1, wherein the operator squares each of the digital baseband real/imaginary signals interpolated and outputted from the resampler, adds the two squared signals, and outputs the calculation; or calculates an absolute value for each of the digital baseband real number/imaginary signals interpolated and outputted from the resampler, adds the absolute value of the two signals, and outputs the calculation.

3. A digital TV receiver including an A/D converter, a carrier recovery, a first resampler, and a symbol clock recovery, wherein the symbol clock recovery comprises:
   a second resampler for resampling the digital passband real/imaginary signals outputted from the A/D converter into the two times the frequency of the symbol clock and interpolating each of the signals;
   an operator for calculating the digital passband real/imaginary signals outputted from the second resampler and outputting the calculation;
   a pre-filter for passing only a frequency of a particular band to recover the symbol clock from the output of the operator;
   a timing error detector for detecting timing error information from the output of the pre-filter;
   an NCO for generating two times the frequency of the symbol clock recovered according to low pass signal component of the filtered timing error information and outputting to the first and the second resamplers.

4. The digital TV receiver of claim 3, wherein the operator squares each of the digital baseband real/imaginary component signals interpolated and outputted from the second resampler, adds the two squared signals, and outputs the calculation; or calculates an absolute value for each of the digital baseband real/imaginary component signals interpolated and outputted from the second resampler, adds the absolute value of the two signals, and outputs the calculation.

5. A digital TV receiver including an A/D converter, a carrier recovery, and a symbol clock recovery, wherein the symbol clock recovery comprises:
   an operator for calculating each of the digital baseband real/imaginary signals outputted from the carrier recovery, and outputting the calculation;
   a pre-filter for passing only a frequency of a particular band to recover the symbol clock from the output of the operator;
   a timing error detector for detecting timing error information from the output of the pre-filter;
   a filtering unit for filtering only the low passband signal from the timing error information outputted from the timing error detector; and
   a variable oscillator for generating two times the frequency of the symbol clock recovered according to low pass signal component of the filtered timing error information and outputting to the A/D converter.

6. The digital TV receiver of claim 5, wherein the operator squares each of the digital baseband real/imaginary signals outputted from the carrier recovery, adds the two squared signals, and outputs the calculation; or calculates an absolute value for each of the digital baseband real/imaginary component signals outputted from the carrier recovery, adds the absolute value of the two signals, and outputs the calculation.

7. A digital TV receiver including an A/D converter, a carrier recovery and a symbol clock recovery, wherein the symbol clock recovery comprises:
   an operator for calculating each of the digital passband real/imaginary signals outputted from the A/D converter, and outputting the calculation;
   a pre-filter for passing only a frequency of a particular band to recover the symbol clock from the output of the operator;
   a timing error detector for detecting timing error information from the output of the pre-filter;
   a filtering unit for filtering only the low passband signal from the timing error information outputted from the timing error detector; and
   a variable oscillator for generating two times the frequency of the symbol clock recovered according to low pass signals of the filtered timing error information and outputting to the A/D converter.

8. The digital TV receiver of claim 7, wherein the operator squares each of the digital passband real/imaginary component signals outputted from the A/D converter, adds the two squared signals, and outputs the calculation; or calculates an absolute value for each of the digital passband real/imaginary component signals outputted from the A/D converter, adds the absolute value of the two signals, and outputs the calculation.

* * * * *